(12) United States Patent
Vaes et al.

(10) Patent No.: US 11,718,021 B2
(45) Date of Patent: Aug. 8, 2023

(54) METHOD FOR CALIBRATING AN APPARATUS FOR PRODUCING AN OBJECT BY MEANS OF ADDITIVE MANUFACTURING, AND APPARATUS FOR THE METHOD

(71) Applicant: Additive Industries B.V., Eindhoven (NL)

(72) Inventors: Mark Herman Else Vaes, Eindhoven (NL); Rob Peter Albert Van Haendel, Eindhoven (NL); Erwin Wijn, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 681 days.

(21) Appl. No.: 16/693,723

(22) Filed: Nov. 25, 2019

(65) Prior Publication Data
US 2020/0164588 A1 May 28, 2020

(30) Foreign Application Priority Data
Nov. 27, 2018 (EP) ..................................... 18208436

(51) Int. Cl.
*B29C 64/153* (2017.01)
*B29C 64/264* (2017.01)
(Continued)

(52) U.S. Cl.
CPC ............ *B29C 64/153* (2017.08); *B22F 10/28* (2021.01); *B22F 10/31* (2021.01); *B22F 12/90* (2021.01);
(Continued)

(58) Field of Classification Search
CPC ... B29C 64/393; B29C 64/129; B29C 64/245; B29C 64/255; B29C 64/264;
(Continued)

(56) References Cited

U.S. PATENT DOCUMENTS

2015/0100149 A1* 4/2015 Coeck ....................... G01S 5/16
700/120

FOREIGN PATENT DOCUMENTS

| WO | 2015/040185 A1 | 3/2015 |
| WO | 2016/085334 A2 | 6/2016 |

(Continued)

*Primary Examiner* — S. Behrooz Ghorishi
(74) *Attorney, Agent, or Firm* — Suiter Swantz pc llo

(57) ABSTRACT

A method for calibrating an apparatus for producing an object by means of additive manufacturing including a process chamber for receiving a bath of material which can be solidified by exposure to electromagnetic radiation, a support for positioning the object in relation to the surface level of the bath of material, and a solidifying device for solidifying a selective layer-part of the material on the surface level by means of electromagnetic radiation. A method including providing, on or near the support, a calibration marker that faces the solidifying device, and providing a calibration system with an imaging unit that can be directed to the support. The method further includes a determining step of the position of the calibration marker, making a solidifying marker that relates to the calibration marker and determining a measure for the position thereof, and determining, with the calibration system, at least a correction vector based on the positions of both the calibration marker and the solidifying marker.

17 Claims, 8 Drawing Sheets

(51) Int. Cl.
  *B29C 64/245*  (2017.01)
  *B29C 64/255*  (2017.01)
  *B29C 64/393*  (2017.01)
  *B29C 64/129*  (2017.01)
  *B22F 10/28*  (2021.01)
  *B22F 12/90*  (2021.01)
  *B22F 10/31*  (2021.01)
  *B33Y 10/00*  (2015.01)
  *B33Y 30/00*  (2015.01)
  *B33Y 40/00*  (2020.01)
  *B33Y 50/02*  (2015.01)
  *B22F 12/49*  (2021.01)

(52) U.S. Cl.
  CPC .......... *B29C 64/129* (2017.08); *B29C 64/245* (2017.08); *B29C 64/255* (2017.08); *B29C 64/264* (2017.08); *B29C 64/393* (2017.08); *B22F 12/49* (2021.01); *B33Y 10/00* (2014.12); *B33Y 30/00* (2014.12); *B33Y 40/00* (2014.12); *B33Y 50/02* (2014.12)

(58) Field of Classification Search
  CPC ... B29C 64/277; B29C 64/153; B29C 64/268; B33Y 10/00; B33Y 30/00; B33Y 40/00; B33Y 50/02; B22F 10/28; B22F 10/31; B22F 12/90; B22F 10/00; B22F 12/49; Y02P 10/25
  See application file for complete search history.

(56) References Cited

FOREIGN PATENT DOCUMENTS

| WO | 2016/085334 A3 | 6/2016 |
| WO | 2017/187147 A1 | 11/2017 |

\* cited by examiner

METHOD FOR CALIBRATING AN APPARATUS FOR PRODUCING AN OBJECT BY MEANS OF ADDITIVE MANUFACTURING, AND APPARATUS FOR THE METHOD

TECHNICAL FIELD AND BACKGROUND

The invention relates to a method for calibrating an apparatus for producing an object by means of additive manufacturing.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to build the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is how to accurately solidify selective parts of the layer.

U.S. Pat. No. 5,832,415 discloses a method for calibrating the deflection control of a laser beam. The method disclosed comprises the step of producing a test pattern with the laser beam. Actual positions of the laser beam on the digitized test pattern are compared to predetermined desired coordinates. This information is used to generate a correction table. The correction table is then used to control the deflection of the laser beam.

The accuracy and speed of calibration obtained with the known method does not satisfy the current demands in additive manufacturing.

BRIEF SUMMARY

It is therefore an object of the invention to improve the accuracy of the apparatus for producing an object by means of additive manufacturing.

To this end, the invention provides a method for calibrating an apparatus for producing an object by means of additive manufacturing. In the method, said apparatus includes:

- a process chamber for receiving a bath of material which can be solidified by exposure to electromagnetic radiation;
- a support for positioning the object in relation to the surface level of the bath of material; and
- a solidifying device for solidifying a selective layer-part of the material on the surface level by means of electromagnetic radiation.

The method according to the invention comprises the steps of providing, on or near the support, a calibration marker that faces the solidifying device; as well as providing a calibration system with an imaging device that can be directed to said support.

According to the invention, the method comprises the further steps of:

a) determining, with the imaging device, a measure for the position of the calibration marker;

b) controlling the solidifying device for making a solidifying marker that relates to the calibration marker;

c) determining, with the imaging device, a measure for the position of the solidifying marker;

d) determining, with the calibration system, at least a correction vector based on the positions of both the calibration marker and the solidifying marker related to this calibration marker.

According to the invention, a calibration marker is provided on or near the support. Once provided, the calibration system is controlled in such a way that a measure for the position of the calibration marker is determined. The measure for the position of the calibration marker is determined with the imaging device. This measure thus relates to a coordinate system in which the imaging device operates, which coordinate system will next be referred to as the sensor coordinate system. Once the position of the calibration marker is determined, the solidifying device may be controlled to make a solidifying mark that relates to the position of the calibration marker. The position of the resulting solidifying marker may then be determined with the same imaging device. Since the imaging device operates in said sensor coordinate system, the position of the solidifying marker thus also relates to the sensor coordinate system. This allows for a correction vector to be determined based on both positions of the calibration marker and the solidifying marker. This allows said solidifying device to be corrected to increase the accuracy of the apparatus. For example, the correction vector obtained by the calibration system may be programmed into the solidifying device such that the solidifying device operates at the intended and desired positions. With this, the object of the invention is achieved.

The solidifying marker may be related to one or more of the following:
- Electromagnetic radiation of the solidifying device during the making of a mark, i.e. from the laser light that is temporarily present on the calibration body;
- Radiation originating from the melting pool, i.e. light radiating from the molten material; and/or
- A physical imprint originating from the solidifying device, i.e. after the laser has molten or removed some material of a calibration body.

Further advantageous embodiments will be described below.

In the method according to the invention, use is made of a calibration system. This calibration system comprises at least one imaging device. In an embodiment of the method, the imaging device may be used in determining a measure of the position of the calibration marker and/or for determining a measure of the position of the solidifying marker. The imaging device is used in this embodiment for obtaining an image of the calibration marker and/or of the solidifying marker. The imaging device allows, in an efficient and cost effective manner, for an image of the calibration marker and—either directly, or separately—for an image of the solidifying marker to be made. Thus, a single image of the calibration marker and the solidifying marker may be made, or separate images of the calibration marker and the solidifying marker may be made. When separate images are made, it is advantageous when the same position of the imaging device, i.e. same field of view, is used, such that both images can be related to each other.

In an embodiment, the solidifying device is used to make a mark on the calibration marker itself. However, this could mean that the calibration marker may only be used for a limited time, in particular when the solidifying device is controlled in such a way that a physical mark is made on the calibration marker. Thus, in an alternative embodiment, the calibration marker is removed before controlling the solidifying device, such that the risk of damaging the calibration marker is reduced. In both cases, however, the mark provided by the solidifying device still relates to the position of the calibration marker.

In an embodiment, the step of determining a measure for the position of the calibration marker comprises determining an expected position of the calibration marker. When the calibration marker is provided, it is placed at a certain known position. Said position may be an absolute or relative position, and may include inaccuracies. Said position of the calibration marker is referred to as the expected position. In this embodiment, the method comprises the further step of controlling, based on said expected position, the apparatus and determining a resulting set position. In particular, the imaging device is controlled and aimed towards the expected position. The imaging device will thus be set at a resulting set position. The resulting set position may deviate from the expected position. A correction may be used to compensate for this.

In an embodiment, the method further comprises the step of determining a calibration marker difference vector, defined as the difference between the expected position of the calibration marker and the resulting set position. This further increases the accuracy of the apparatus.

The apparatus may be controlled in such a way that the center of the image is directed towards the expected position. However, it is possible that the center of the image is not in line with the expected position, but deviates therefrom. The difference may be used to determine the calibration marker difference vector in order to increase the accuracy of the apparatus. In an embodiment, the step of determining the measure for the position of the solidifying marker comprises determining an expected position of the calibration marker; and controlling, based on said expected position, the apparatus and determining a resulting set position. Thus, the apparatus is operated based on the expected position of the calibration marker, in order to make a solidifying mark on the position of the calibration marker. It is noted that the actual calibration marker may be present or absent, as already described above. The use of the imaging device allows the apparatus to work in the sensor coordinate system, such that the actual presence of the calibration marker is not necessary. In any event, the imaging device is directed to the expected position as well, and the imaging device is used to determine the position of the solidifying mark. Then the actual position of the solidifying mark may be related to the expected position of the calibration marker and/or to the resulting set position of the apparatus.

In an embodiment, the method further comprises the step of determining a solidifying marker difference vector, defined as the difference between the solidifying marker and the resulting set position. In particular, this resulting set position is the set position of the imaging device.

Based on solidifying marker difference vector and the calibration marker difference vector, a correction vector (Vsc) may be determined. This correction vector allows the solidifying marker to exactly co-align with the position of the calibration marker.

In an embodiment, the imaging device is used for determining the resulting set position. As described before, the center of the imaging device relates to the resulting set position.

In an embodiment, the imaging device is arranged in such a way that an optical path of the imaging device, in use of the apparatus, coincides, preferably at least partly, with an optical path of the electromagnetic radiation of the solidifying device. This allows for very accurate corrections, since the imaging device is fully aligned with the solidifying device, giving direct feedback on inaccuracies.

Moreover, if the optical path of the imaging device coincides, preferably at least partly, with an optical path of the electromagnetic radiation of the solidifying device the field of view of the imaging device is relatively small resulting in a relative high spatial resolution and thereby in a relative accurate calibration.

Furthermore, if the optical path of the imaging device coincides, preferably at least partly, with an optical path of the electromagnetic radiation of the solidifying device there is no need for the imaging device to be calibrated as regards for instance distortion of the image obtainable by the imaging device. The distortion may for instance be due to optics of the imaging device. In particular, it is beneficial if the calibration marker and/or the solidifying marker are positioned near the center of the imaging device, meaning in the center of a field of view, of the imaging device and thereby avoid, or at least significantly reduce, the effect of distortion of the imaging device and thereby allow for a relative accurate calibration.

A yet further advantage of having the optical path of the imaging device coinciding, preferably at least partly, with an optical path of the electromagnetic radiation of the solidifying device is that an imaging device comprising a relative low number of imaging pixels may be used while realizing a relative accurate calibration. This is beneficial for realizing a cost effective calibration system.

It is beneficial if during said step of determining said measure for the position of the calibration marker and/or during said step of determining said measure for the position of the solidifying marker, a ratio of a surface area of a field of view of the imaging device on or near the support and a surface area of the calibration marker on or near the support is in the range of 1 to 10000, preferably in the range of 10-1000, more preferably in the range of 10-100. Having a ratio in this range is beneficial for realizing a relatively high spatial resolution and thereby in a relative accurate calibration.

In an embodiment, the apparatus for producing an object by means of additive manufacturing comprises a further solidifying device. The method comprises the further steps of:
  controlling the further solidifying device for making a further solidifying marker that relates to the calibration marker;
  determining, with the calibration system, a measure for the position of the further solidifying marker;
  determining, with the calibration system, at least a further correction vector based on the positions of both the calibration marker and the further solidifying marker related to this calibration marker.

According to this embodiment, the calibration method as described with respect to the initial solidifying device is repeated for the further solidifying device. Here, a further mark is made with the further solidifying device, and the position of this mark is compared to the position of the calibration marker. It is conceivable in this regards that the position of the calibration marker as determined for the initial solidifying device is used, or that the position of the calibration marker is once again determined. In any event, using the same calibration marker to align said solidifying device and said further solidifying device allows multiple solidifying devices to be calibrated with respect to the same coordinate system. This allows a very accurate and rapid manufacturing with multiple lasers, for example.

It is beneficial if said measure for the position of the further solidifying marker is determined with said imaging device.

In an embodiment, the calibration system comprises at least one further imaging device, wherein said further imaging device is used for obtaining an image of the calibration marker and/or of the further solidifying marker. In this embodiment, the further imaging device, may be allocated to the further solidifying device. This improves the speed of calibration, as it allows for calibration of multiple solidifying devices at the same time. Additionally, by using multiple imaging devices it is possible to increase the accuracy of calibration, as spatial resolution of each imaging device may be increased without affecting the general calibration possibilities.

In an embodiment, the further imaging device is arranged such that an optical path of the further imaging device, in use of the apparatus, coincides, preferably at least partly, with an optical path of the electromagnetic radiation of the further solidifying device. As described before, this is advantageous, as it allows the further imaging device to be fully aligned with the further solidifying device, giving direct feedback on inaccuracies.

Moreover, if the optical path of the further imaging device coincides, preferably at least partly, with an optical path of the electromagnetic radiation of the further solidifying device the field of view of the further imaging device is relatively small resulting in a relative high spatial resolution and thereby in a relative accurate calibration.

Furthermore, if the optical path of the further imaging device coincides, preferably at least partly, with an optical path of the electromagnetic radiation of the further solidifying device there is no need for the further imaging device to be calibrated as regards for instance distortion of the image obtainable by the further imaging device. The distortion may for instance be due to optics of the further imaging device. In particular, it is beneficial if the calibration marker and/or the further solidifying marker are positioned near the center of the further imaging device, meaning in the center of a field of view, of the further imaging device and thereby avoid, or at least significantly reduce, the effect of distortion of the further imaging device and thereby allow for a relative accurate calibration.

A yet further advantage of having the optical path of the further imaging device coinciding, preferably at least partly, with an optical path of the electromagnetic radiation of the further solidifying device is that a further imaging device comprising a relative low number of imaging pixels may be used while realizing a relative accurate calibration. This is beneficial for realizing a cost-effective calibration system.

It is beneficial if during said step of determining said measure for the position of the calibration marker and/or during said step of determining said measure for the position of the further solidifying marker, a ratio of a surface area of a field of view of the further imaging device on or near the support and a surface area of the calibration marker on or near the support is in the range of 1 to 10000, preferably in the range of 10-1000, more preferably in the range of 10-100. Having a ratio in this range is beneficial for realizing a relative high spatial resolution and thereby in a relative accurate calibration.

In an embodiment, at least a further calibration marker is provided, and at least part of the method is repeated at least once for this at least one further calibration marker. By providing further calibration markers, it is possible to calibrate the apparatus over a predetermined number of points. For example, when a grid of calibration markers is provided, calibration of the apparatus is possible over the entire area determined by said grid. Said grid may be a regular or irregular grid, for example a regular rectangular grid. Calibration onto said grid may further comprise the step of interpolating calibration results to improve the accuracy of the apparatus.

In an embodiment, the method comprises the step of providing a calibration body on which the calibration marker is provided, and placing said calibration body on the support in such a way that the calibration marker is directed to the solidifying device. In particular, the calibration body may be a plate-like body, on which one or more calibration markers are provided. As described above, when using a calibration grid of calibration markers, this calibration grid may be provided on said calibration body. This allows for an accurate and reproducible calibration, in particular when said calibration body is very precise. Here it is important to note that the calibration is reproducible in time, e.g. for the same apparatus, but the calibration body may also be used to calibrate a multitude of apparatuses, such that these apparatuses are inter-calibrated with respect to each other.

In an embodiment, the apparatus for producing an object by means of additive manufacturing comprises a thermal conditioning arrangement for thermally conditioning said imaging device, wherein the method comprises the step of:
  thermally conditioning, by said thermal conditioning arrangement, said imaging device. Thermally conditioning the imaging device is beneficial for avoiding, or at least reducing, a relative low calibration accuracy due to variations in the thermal conditions of the imaging device.

In this regard, it is beneficial if the apparatus for producing an object by means of additive manufacturing comprises a deflector unit for deflecting said electromagnetic radiation, wherein said thermal conditioning arrangement is further arranged for thermally condition said deflector unit and preferably for thermally conditioning a part of said apparatus connecting said imaging device to said deflector unit, wherein the method further comprises the step of:

thermally conditioning, by the thermal conditioning arrangement, the deflector unit, the imaging device and preferably a part of said apparatus connecting said imaging device to said deflector unit. This is beneficial for maintaining an image field of said imaging device relative stable in relation to said electromagnetic radiation and thereby realizing a relative accurate calibration.

It is beneficial if said method further comprises the step of:

thermally conditioning, by said thermal conditioning unit, said further imaging device. Thermally conditioning the further imaging device is beneficial for avoiding, or at least reducing, a relative low calibration accuracy due to variations in the thermal conditions of the further imaging device.

In this regard, it is advantageous if said apparatus comprises a further deflector unit for deflecting said electromagnetic radiation of said further solidifying device, wherein said thermal conditioning arrangement is further arranged for thermally condition said further deflector unit and preferably for thermally conditioning a further part of said apparatus connecting said further imaging device to said further deflector unit, wherein said method comprises the step of:

thermally conditioning, by said thermal conditioning arrangement, the further deflector unit, the further imaging device and preferably a further part of said apparatus connecting said further imaging device to said further deflector unit. This is beneficial for maintaining an image field of said further imaging device relative stable in relation to said electromagnetic radiation of said further solidifying device and thereby realizing a relative accurate calibration.

According to an aspect, the invention provides an apparatus for producing an object by means of additive manufacturing, comprising
  a process chamber for receiving a bath of material which can be solidified by exposure to electromagnetic radiation;
  a support for positioning the object in relation to the surface level of the bath of material;
  a solidifying device for solidifying a selective layer-part of the material on the surface level by means of electromagnetic radiation; and
  a calibration system having an imaging device that may be directed to the support.

Said calibration system is adapted and arranged for:
  a) determining, with the imaging device, a measure for the position of the calibration marker;
  b) controlling the solidifying device for making a solidifying marker that relates to the calibration marker;
  c) determining, with the imaging device, a measure for the position of the solidifying marker;
  d) determining at least a correction vector based on the positions of both the calibration marker and the solidifying marker related to this calibration marker.

The apparatus with calibration system allows for an effective and reproducible calibration of the apparatus. Additionally, since the apparatus comprises the calibration system, calibration may be executed at any time. For instance, calibration may be performed at regular time intervals. This increases the accuracy of the apparatus. Further advantages of the apparatus have already been indicated with respect to the method.

In an embodiment, the imaging device is arranged for obtaining an image of the calibration marker and/or of the solidifying marker. As indicated before, the imaging device may be arranged in such a way that an optical path of the imaging device, in use of the apparatus, coincides, preferably at least partly, with an optical path of the electromagnetic radiation of the solidifying device.

Moreover, if the optical path of the imaging device coincides, preferably at least partly, with an optical path of the electromagnetic radiation of the solidifying device the field of view of the imaging device is relatively small resulting in a relative high spatial resolution and thereby in a relative accurate calibration.

Furthermore, if the optical path of the imaging device coincides, preferably at least partly, with an optical path of the electromagnetic radiation of the solidifying device there is no need for the imaging device to be calibrated as regards for instance distortion of the image obtainable by the imaging device. The distortion may for instance be due to optics of the imaging device. In particular, it is beneficial if the calibration marker and/or the solidifying marker are positioned near the center of the imaging device, meaning in the center of a field of view, of the imaging device and thereby avoid, or at least significantly reduce, the effect of distortion of the imaging device and thereby allow for a relative accurate calibration.

A yet further advantage of having the optical path of the imaging device coinciding, preferably at least partly, with an optical path of the electromagnetic radiation of the solidifying device is that an imaging device comprising a relative low number of imaging pixels may be used while realizing a relative accurate calibration. This is beneficial for realizing a cost effective calibration system.

It is beneficial if during said step of determining said measure for the position of the calibration marker and/or during said step of determining said measure for the position of the solidifying marker, a ratio of a surface area of a field of view of the imaging device on or near the support and a surface area of the calibration marker on or near the support is in the range of 1 to 10000, preferably in the range of 10-1000, more preferably in the range of 10-100. Having a ratio in this range is beneficial for realizing a relative high spatial resolution and thereby in a relative accurate calibration.

It is beneficial if the apparatus comprises a thermal conditioning arrangement for thermally conditioning said imaging device. Thermally conditioning the imaging device is beneficial for avoiding, or at least reducing, a relative low calibration accuracy due to variations in the thermal conditions of the imaging device.

In this regard it is advantageous if said apparatus comprises a deflector unit for deflecting said electromagnetic radiation, wherein said thermal conditioning arrangement is further arranged for thermally condition said deflector unit and preferably for thermally conditioning a part of said apparatus connecting said imaging device to said deflector unit. Thermally conditioning the deflector unit, the imaging device and preferably a part of said apparatus connecting said imaging device to said deflector unit is beneficial for maintaining an image field of said imaging device relative stable in relation to said electromagnetic radiation and thereby realizing a relative accurate calibration.

It is beneficial if said thermal conditioning arrangement is arranged for thermally conditioning said further imaging device. Thermally conditioning the further imaging device is beneficial for avoiding, or at least reducing, a relative low calibration accuracy due to variations in the thermal conditions of the further imaging device.

In this regard it is advantageous if said apparatus comprises a further deflector unit for deflecting said electromagnetic radiation of said further solidifying device, wherein said thermal conditioning arrangement is further arranged for thermally condition said further deflector unit and preferably for thermally conditioning a further part of said apparatus connecting said further imaging device to said further deflector unit. Thermally conditioning the further deflector unit, the further imaging device and preferably a further part of said apparatus connecting said further imaging device to said further deflector unit is beneficial for maintaining an image field of said further imaging device relative stable in relation to said electromagnetic radiation of said further solidifying device and thereby realizing a relative accurate calibration.

In an embodiment, the apparatus comprises a further solidifying device, and said calibration system is adapted and arranged for:
  controlling the further solidifying device for making a further solidifying marker that relates to the calibration marker;
  determining, with the calibration system, a measure for the position of the further solidifying marker;
  determining at least a further correction vector based on the positions of both the calibration marker and the further solidifying marker related to this calibration marker.

With this embodiment, it is possible to perform an inter-solidifying device calibration, for example at regular time intervals, without the need for an external calibration service.

In an embodiment, the calibration system comprises at least one further imaging device for obtaining an image of the calibration marker and/or of the further solidifying marker. This further imaging device may be arranged in such a way that an optical path of the further imaging device, in use of the apparatus, coincides, preferably at least partly, with an optical path of the electromagnetic radiation of the further solidifying device.

Moreover, if the optical path of the further imaging device coincides, preferably at least partly, with an optical path of the electromagnetic radiation of the further solidifying device the field of view of the further imaging device is relatively small resulting in a relative high spatial resolution and thereby in a relative accurate calibration. This increases the accuracy of calibration.

Furthermore, if the optical path of the further imaging device coincides, preferably at least partly, with an optical path of the electromagnetic radiation of the further solidifying device there is no need for the further imaging device to be calibrated as regards for instance distortion of the image obtainable by the further imaging device. The distortion may for instance be due to optics of the further imaging device. In particular, it is beneficial if the calibration marker and/or the further solidifying marker are positioned near the center of the further imaging device, meaning in the center of a field of view, of the further imaging device and thereby avoid, or at least significantly reduce, the effect of distortion of the further imaging device and thereby allow for a relative accurate calibration.

A yet further advantage of having the optical path of the further imaging device coinciding, preferably at least partly, with an optical path of the electromagnetic radiation of the further solidifying device is that a further imaging device comprising a relative low number of imaging pixels may be used while realizing a relative accurate calibration. This is beneficial for realizing a cost-effective calibration system.

It is beneficial if during said step of determining said measure for the position of the calibration marker and/or during said step of determining said measure for the position of the further solidifying marker, a ratio of a surface area of a field of view of the further imaging device on or near the support and a surface area of the calibration marker on or near the support is in the range of 1 to 10000, preferably in the range of 10-1000, more preferably in the range of 10-100. Having a ratio in this range is beneficial for realizing a relative high spatial resolution and thereby in a relative accurate calibration.

In an embodiment, the apparatus comprises a calibration body on which at least the calibration marker is provided. Advantages of this calibration body have already been described above.

BRIEF DESCRIPTION OF THE DRAWINGS

The invention will next be explained by means of the accompanying figures. In the figures.

DETAILED DESCRIPTION

Figure 1:
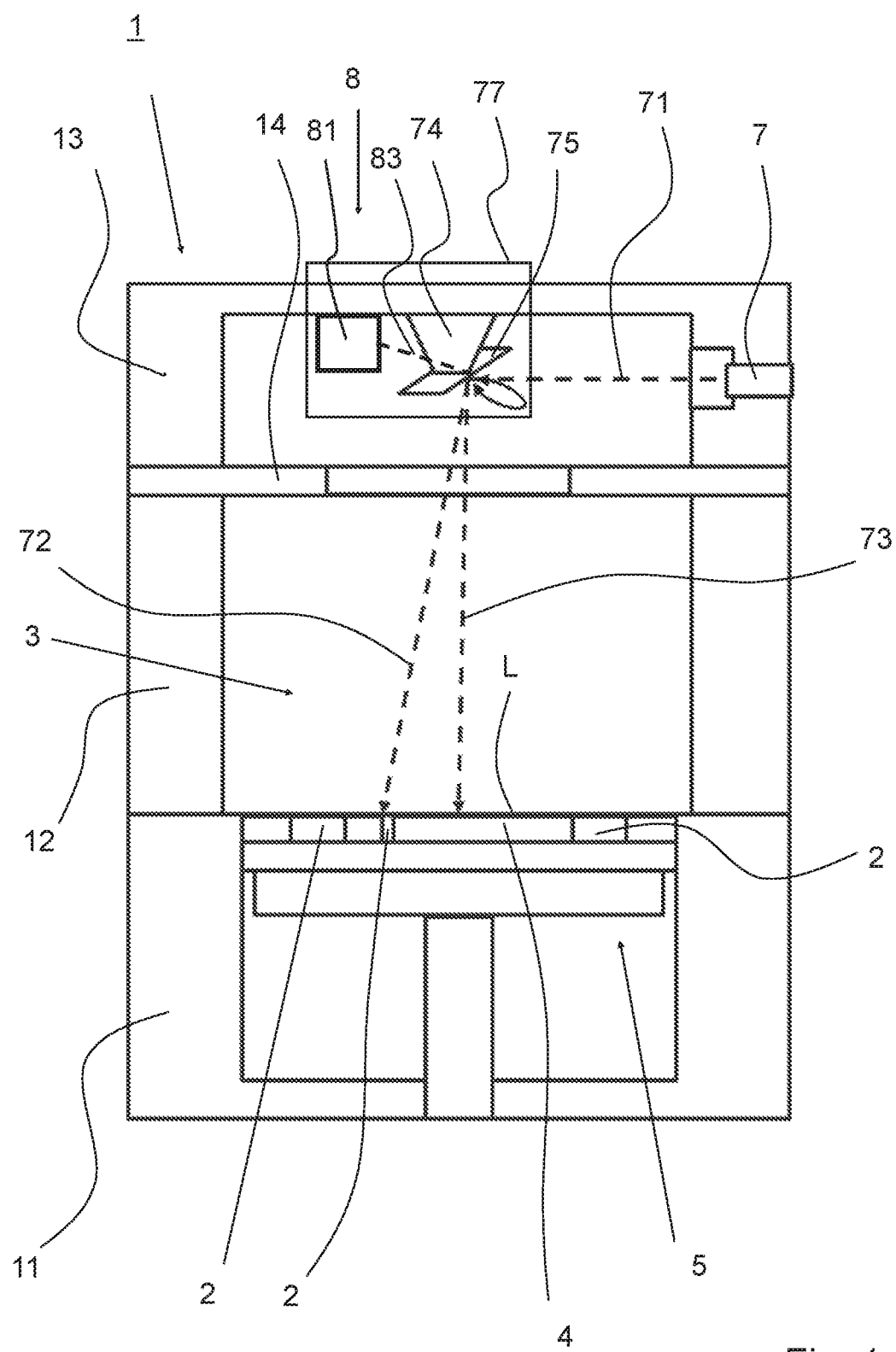
FIG. 1 shows a schematic overview of an apparatus according to the invention, arranged for producing an object by means of additive manufacturing.

FIG. 1 shows an overview of an apparatus 1 for producing an object 2 by means of additive manufacturing. The apparatus 1 is build from several frame parts 11, 12, 13. The apparatus comprises a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material. In the embodiment shown, the solidifying device 7 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 71 emitted by the laser device 7 is deflected by means of a deflector unit 75, which uses a rotatable optical element to direct the emitted radiation 71 towards the surface L of the layer of material 4. Depending on the position of the deflector unit 75, radiation may be emitted, as an example, according to rays 72, 73.

The apparatus 1 may further comprise a recoating device (not shown) which can be displaced along the surface L of the bath for levelling the surface L of the bath of material 4. Such a recoating device is known per se to those skilled in the art.

The apparatus 1 according to the invention comprises a calibration system 8 with an imaging device 81. Details of this calibration system 8 and the imaging device 81 will become apparent later, when the method according to the invention is described with reference to FIG. 7.

Apparatus 1 further comprises a thermal conditioning arrangement 77 for thermally conditioning said imaging device 81, said deflector unit 75 and for thermally conditioning a part of said apparatus connecting said imaging device 81 to said deflector unit 75. The thermal conditioning arrangement 77 provides a housing for said imaging device 81, said deflector unit 75 and said part of said apparatus connecting said imaging device 81, wherein a temperature inside said housing may be maintained at a predetermined temperature level. A relative stable predetermined temperature inside said housing is beneficial for realizing and maintaining a relative accurate calibration.

Figure 2:
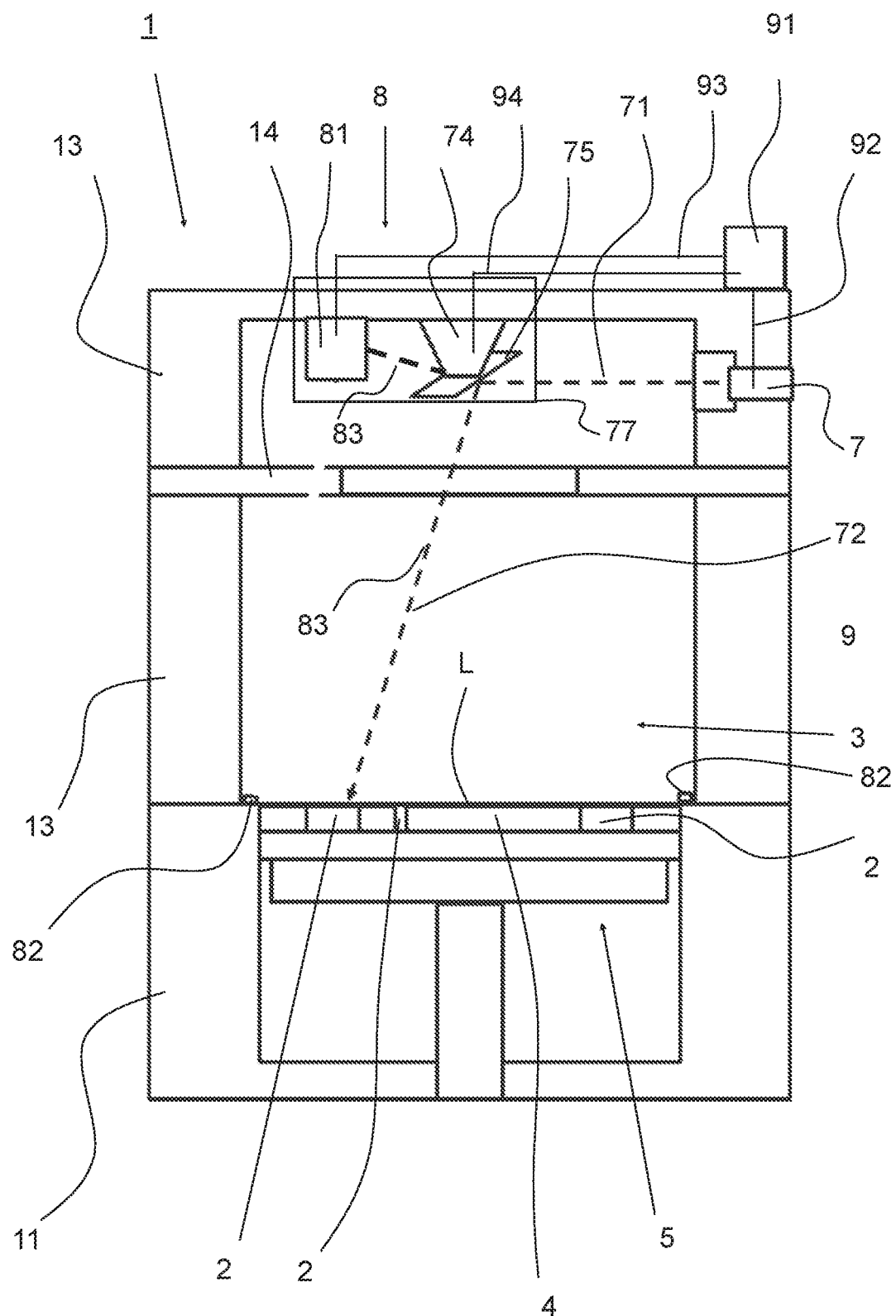
FIG. 2 shows a schematic overview of an alternative embodiment of the apparatus according to the invention.

FIG. 2 shows an alternative embodiment of an apparatus 1 for producing an object 2 by means of additive manufacturing. For sake of brevity, parts similar to those parts as described with reference to FIG. 1 have been given the same reference sign, and will not be discussed further. The apparatus 1 according to this embodiment comprises a calibration system 8, with an imaging device 81 that will be used for calibration of the apparatus. The apparatus according to this embodiment further comprises a control unit 91 connected, by means of line 93, to the imaging device 81. To this end, the control unit 91 may be connected, by means of line 92, to the solidifying device, and/or to the deflector unit 75, by means of line 94.

As can be seen in FIG. 2, the imaging device, in particular an optical imaging device, is formed by a camera unit 81. The camera unit is arranged for making one or more images of calibration markers 82 provided on or near the support 5, in the example shown connected to the lower frame part 11. The one or more images of one or more of the calibration markers 82 obtained by the imaging device are processed by the calibration system 8, for example in that they are fed to the control unit 91 for being processed there.

In particular, said calibration system comprises said imaging device 81 and said control unit 91, and is arranged for determining, with the imaging device 81, a measure for the position of the calibration marker 82. Additionally, the calibration system is arranged for controlling the solidifying device 7 for making a solidifying marker that relates to the calibration marker. The calibration unit 8 may determine, with the imaging device 81, a measure for the position of the solidifying marker. And the calibration system is arranged for determining at least a correction vector based on the positions of both the calibration marker and the solidifying marker related to this calibration marker. These steps according to the invention will be explained in more detail with respect to FIG. 7.

Figure 3:
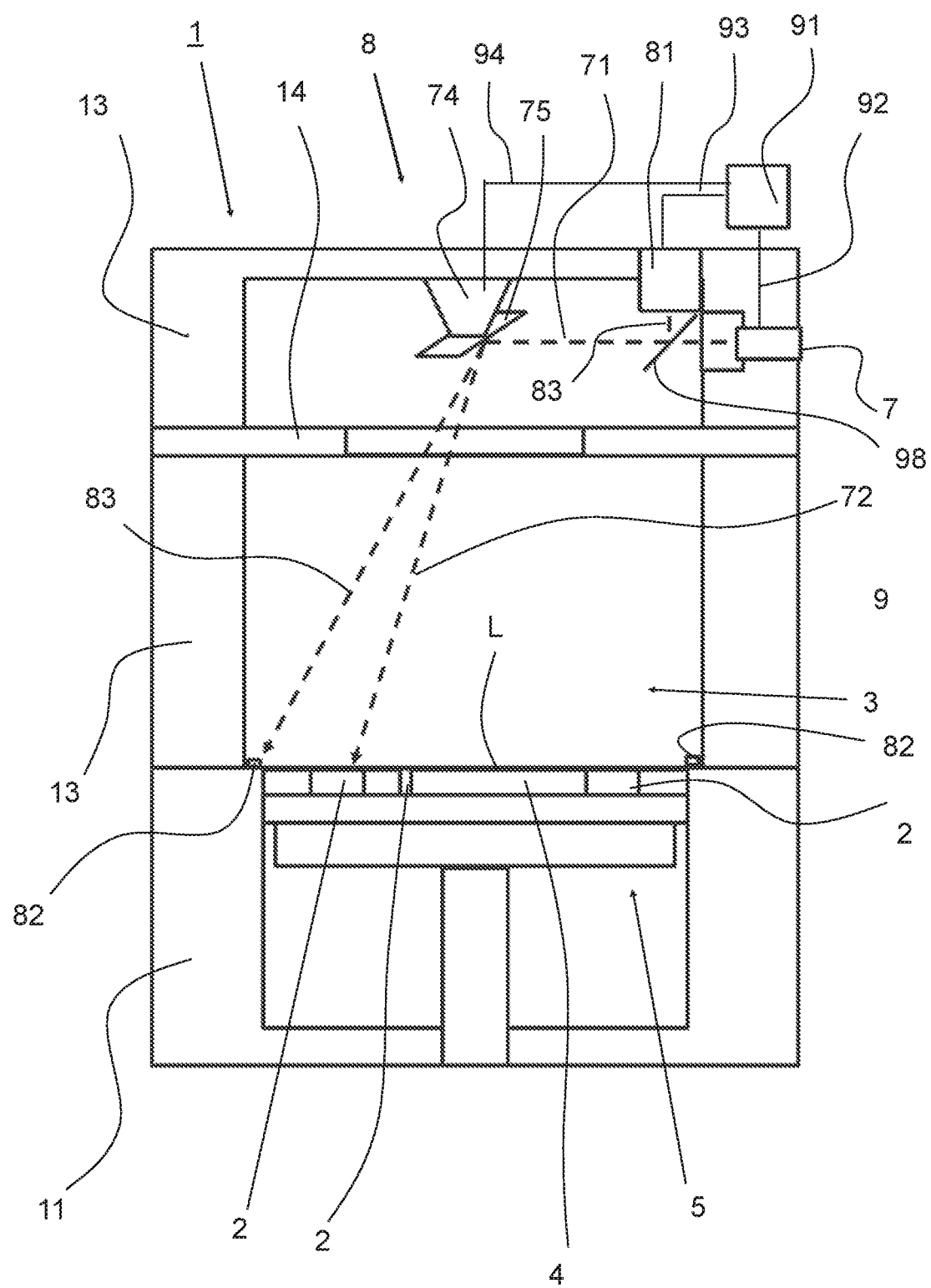
FIG. 3 shows a schematic overview of a further embodiment of the apparatus according to the invention.

FIG. 3 shows a further embodiment of an apparatus 1 suitable to be used in the method according to the invention. The apparatus 1 largely corresponds to the apparatus as shown in FIG. 2, and for reasons of conciseness, mainly the differences will be described. The thermal conditioning arrangement is not shown in FIG. 3. As can be seen in FIG. 3, the main difference is that the position of the imaging device 81 differs with respect to the embodiment shown in FIG. 2. In FIGS. 1-4 the imaging device 81 is arranged such that an optical path 83 of the imaging device 81, during use of the imaging device 81, at least partly coincides with an optical path 71 of the electromagnetic radiation generated by the solidifying device 7, during use of the solidifying device. It should be expressly noted in this respect, that the imaging device 81 and the solidifying device 7 do not necessarily have to be operated at the same time, although this is conceivable. For instance, in an embodiment, the characteristic is only registered when the solidifying device is free from emitting electromagnetic radiation, although it is also possible that the characteristic registered is electromagnetic radiation itself. In the embodiment shown in FIG. 3, use is made of an optical device, such as a semi-transparent mirror element, or a single lens reflex arrangement, to be able to obtain an image of the calibration area, using the imaging unit 81, via the deflector unit 75, and to use the information obtained by the imaging unit 81, to calibrate or control the deflector unit 75 and/or the solidifying device 7 for controlling the position of electromagnetic radiation on the surface level L of the bath of material. The method according to the invention, using such an apparatus, will be described further below.

Figure 4:
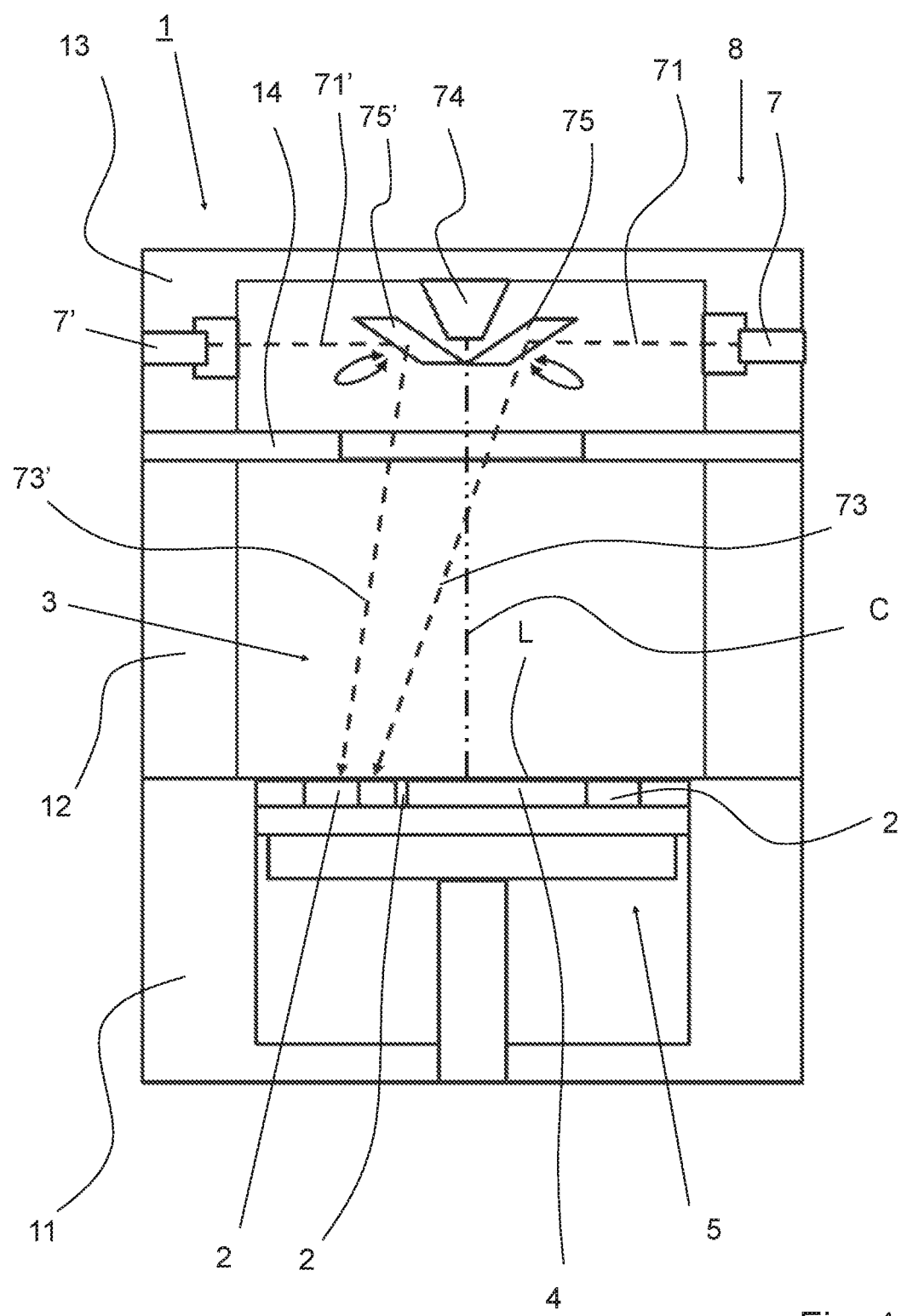
FIG. 4 shows a schematic overview of yet a further embodiment of the apparatus according to the invention.

FIG. 4 shows an overview of an apparatus 1 for producing an object 2 by means of additive manufacturing, according to yet a further embodiment of the present invention. As in the previous embodiments, a first solidifying device 7 is provided for solidifying a selective part of the material by means of electromagnetic radiation. The top part 13 of the apparatus 1 also comprises a further solidifying device 7 for solidifying a selective part of the material by means of electromagnetic radiation. As can be seen, the electromagnetic radiation 71' emitted by the further laser device 7' is deflected by means of a further rotatable deflector unit 75' to direct the emitted radiation 71' thereof towards the surface L of the layer of material 4.

In the embodiment shown, the solidifying device 7 and the further solidifying device 7' are laser devices, which are arranged for producing electromagnetic radiation in the form of laser light, in order to melt a powdered material provided on the support, which then, after cooling forms a solidified part of the object to be produced. However, the invention is not limited to this type of solidifying device, but comprises in general solidifying devices that use electromagnetic radiation. Furthermore, the type of electromagnetic radiation emitted by the plurality of solidifying devices may be the same for each and every solidifying device, although it is conceivable that the type of electromagnetic radiation emitted by the plurality of solidifying devices differs for at least two of the plurality of solidifying devices.

It can be seen furthermore in FIG. 4, that the plurality of deflector units 75, 75' are positioned near a line C perpendicular to the plane defined by the object working area L, and which line C passes through geometrical centre of gravity of the object working area L. In other words, the deflector units 75, 75' are substantially provided above a centre part of the object working area L. This allows each of the plurality of solidifying devices to easily reach substantially the entire object working area, such that, for instance, simultaneous solidifying of different parts of a single object may occur.

Not shown in FIG. 4, for reasons of keeping the Figures clear and legible, is that imaging devices may be provided for each solidifying device 7, 7'. Moreover, the thermal conditioning arrangement is not shown in FIG. 4. Thus, like the embodiments shown in FIG. 2 and FIG. 3, an imaging device 81 may be provided for each solidifying device. In particular, one or more of the imaging devices 81 may be arranged such that an optical path 83 of the respective imaging device 81, during use of the imaging device 81, at least partly coincides with an optical path 71 of the electromagnetic radiation generated by the corresponding solidifying device 7, 7'. These one or more imaging devices are hence part of the calibration system 8. The method according to the invention is in particular very advantageous in calibrating such an apparatus, in particular for aligning a plurality of solidifying devices with each other. The invention is in principle not limited to the number of solidifying devices used, or to the number of imaging devices used.

Referring back to FIG. 4, it can be seen that the apparatus 1 further comprises a control unit 74 arranged for controlling the plurality of solidifying devices 7, 7', wherein the control means are arranged for simultaneously operating the plurality of solidifying devices 7, 7' in different parts of the object working area L.

Thus, with the apparatus shown in FIG. 4, the plurality of solidifying devices 7, 7' may be controlled to work in substantially the entire object working area L, such that it is possible to solidify different parts of a single object 2 at the same time. By simultaneously solidifying different parts of a single object, this object may be produced more quickly, and total production time of the object may be decreased.

Figure 5:
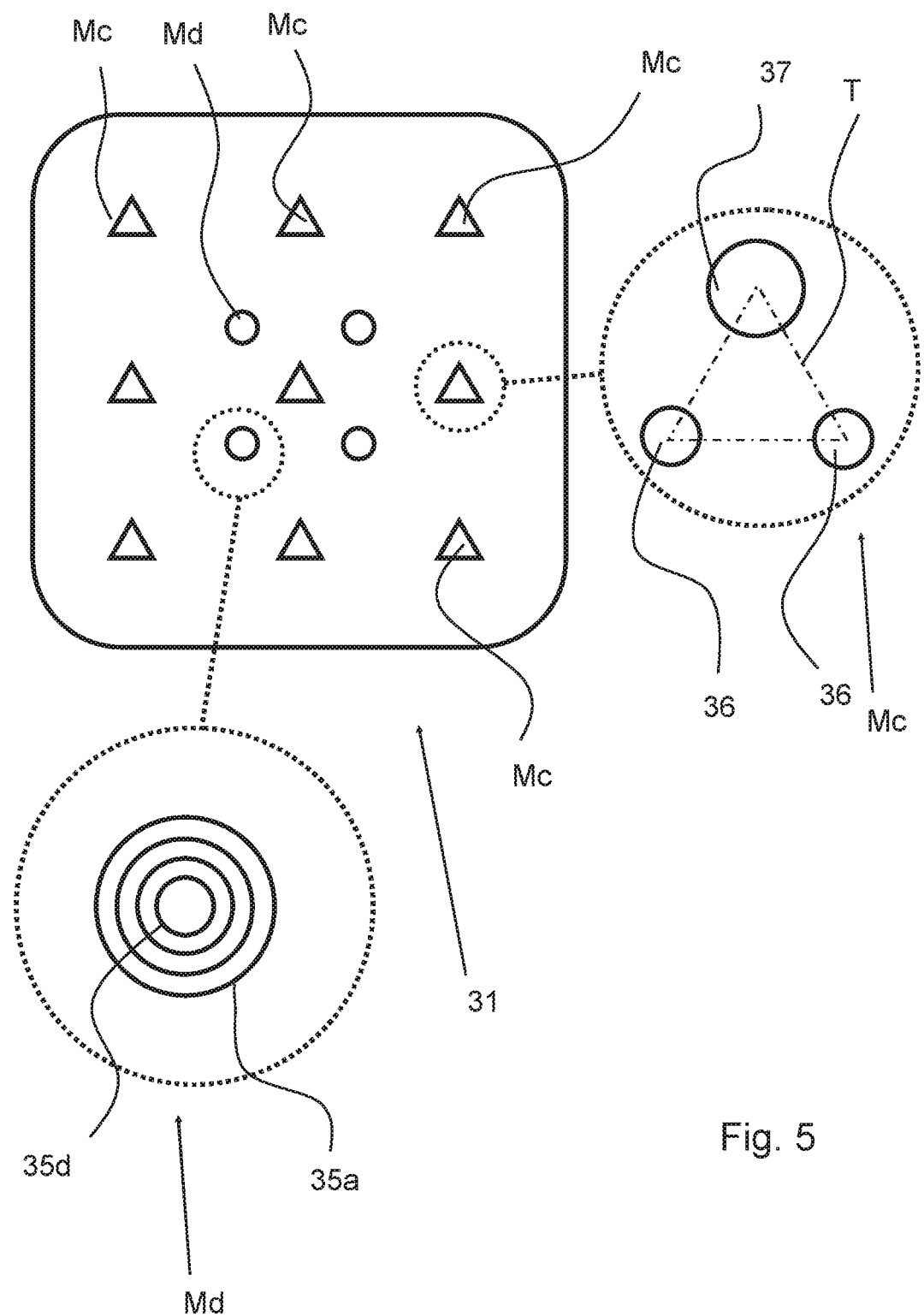
FIG. 5 shows an embodiment of a calibration body that may be used in a method according to the invention.

FIG. 5 shows an embodiment of a calibration body 31 that may be used in the method according to the invention. The calibration body 31 comprises at least one calibration marker Mc. In the embodiment shown a grid of regularly spaced calibration markers Mc are used. Here, a total number of nine calibration markers Mc are used, but it will be appreciated to those skilled in the art that more or fewer calibration markers are possible. As better shown in the enlargement of FIG. 5, the calibration markers Mc comprise a total number of three circles or dots 36, 37. These dots are provided on vertices of an imaginary equilateral triangle T. One of the circles or dots 37 is larger than the other two circles or dots 36, such that information on the orientation of the calibration body 31 may be obtained when the calibration marker Mc is viewed.

The calibration body also comprises, in this embodiment, at least one distortion marker Md, comprising at least a number of concentric rings 35a-35d. This distortion marker Md will in particular be used with an apparatus comprising at least one imaging device. The calibration body shown in FIG. 5 comprises a total of four distortion markers Md, since it is intended to be used with an apparatus comprising four solidifying devices, each with their respective imaging device.

Figure 6:
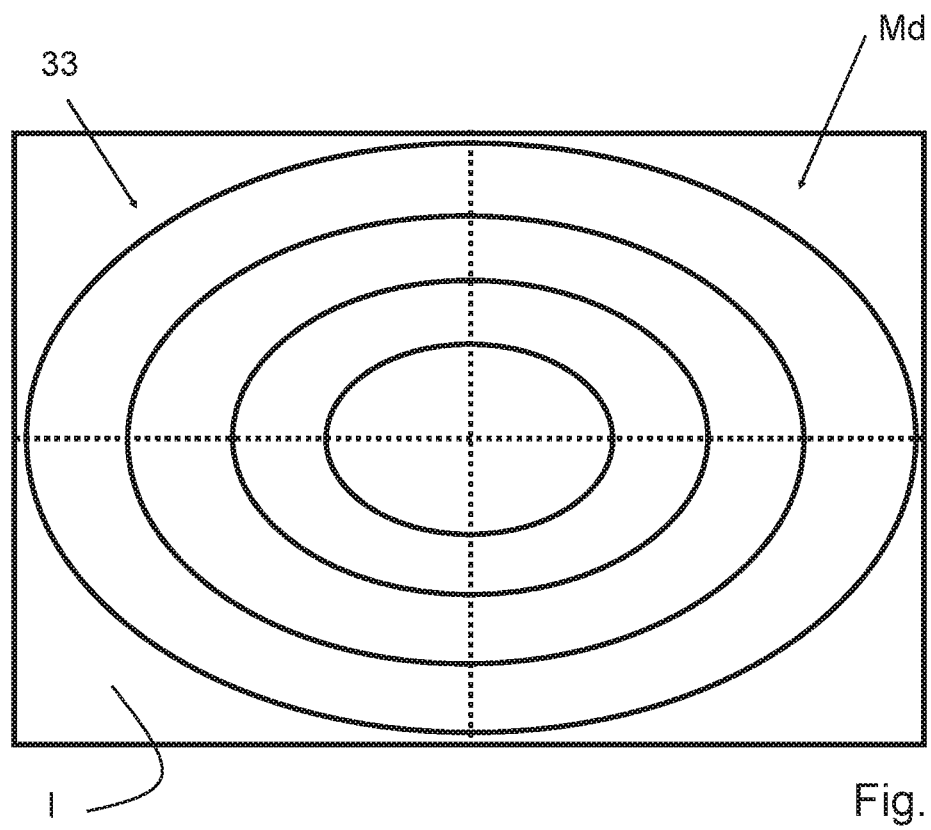
FIG. 6 shows a top view of a distortion marker that may be provided on the calibration body of FIG. 5.

FIG. 6 shows an image I of the distortion marker Md obtained with an imaging device. Here it can be seen that, compared to the original marker as shown in FIG. 5, some distortion has taken place. The concentric rings are imaged by the imaging device as concentric ovals. Based on this image, a correction factor may be applied in the images obtained. In particular, the horizontal and vertical magnification (in pixels/mm) may be determined. This is useful for any further calibration of the apparatus when an imaging device is used.

Figure 7A:
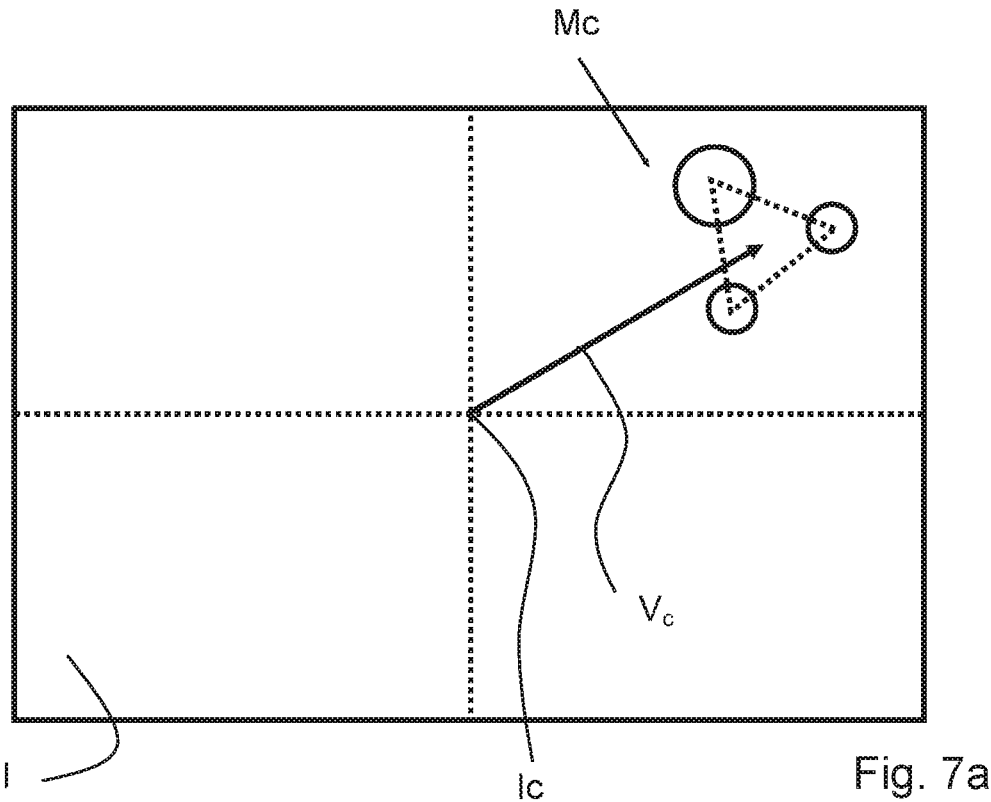
FIG. 7a-7c show steps of an embodiment of the method according to the invention.
Figure 7B:
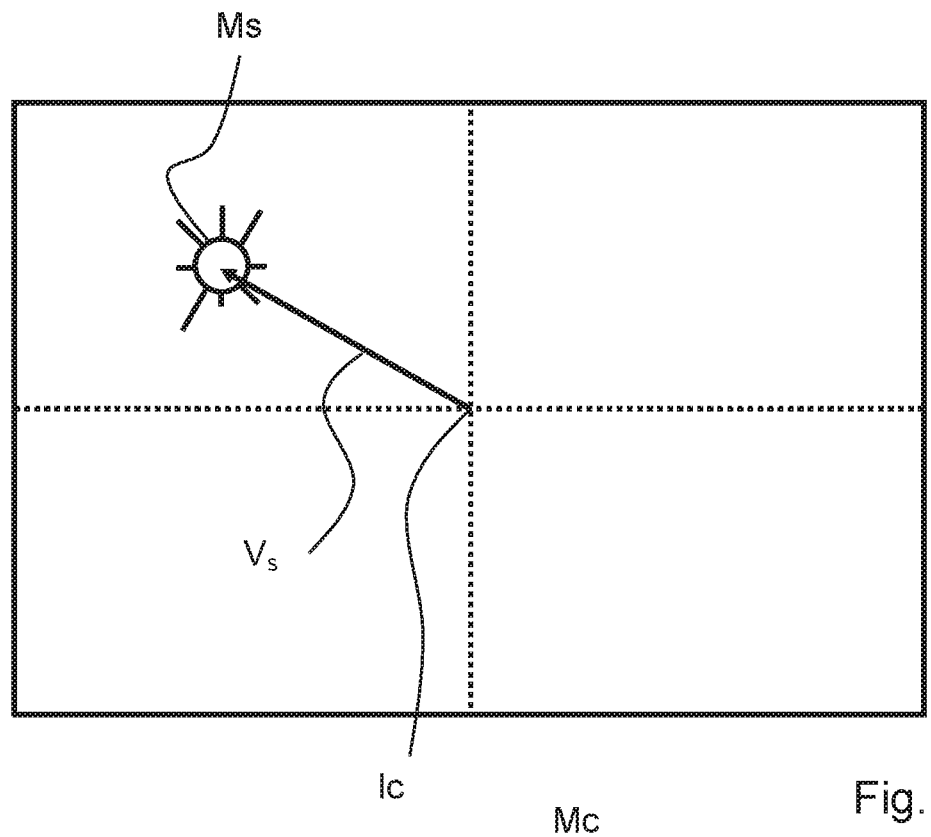
Figure 7C:
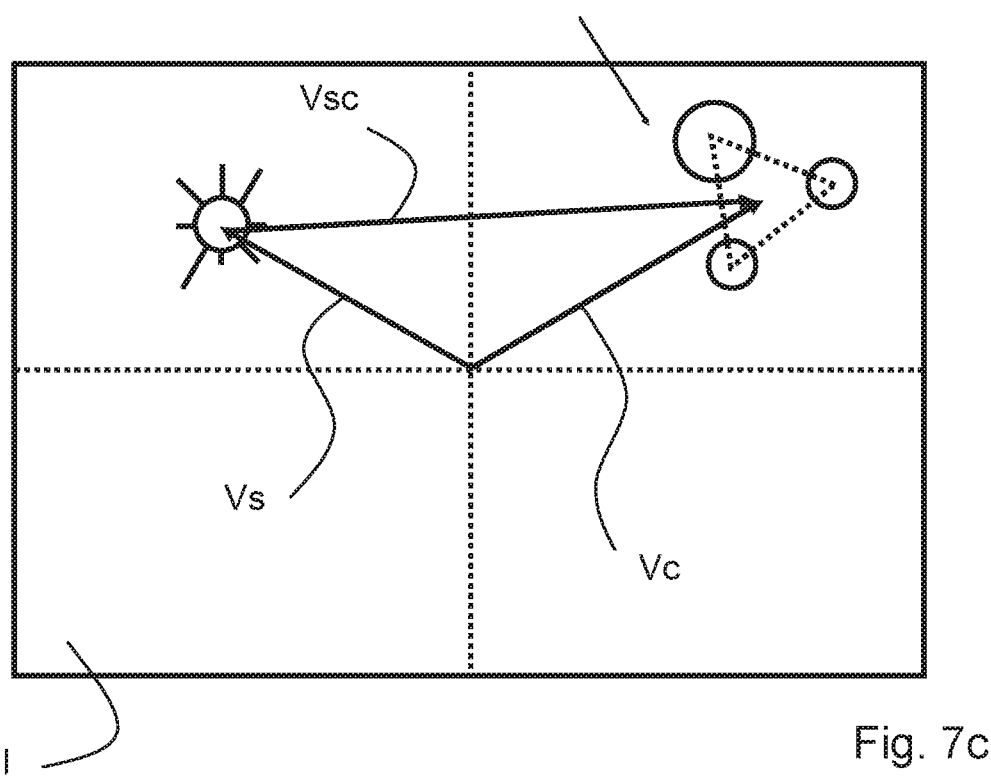

FIGS. 7a to 7c show several steps of an embodiment of the method according to the present invention. The method according to the invention comprises the steps of providing, on or near the support, a calibration marker that faces the solidifying device. In particular, the calibration body 31, comprising a number of calibration markers Mc, may be placed on the support, with the calibration markers Mc facing the solidifying device. This may be done in such a way that an absolute placement of the calibration body 31 in the apparatus 1 is achieved. In such an absolute placement of the calibration body 31, the expected position of each calibration marker Mc is known. This allows a calibration to compare this expected position of each calibration marker to the respective set position, as will be described below. An absolute placement is possible, for example, when a three point support is used for connecting the calibration body to the support. Other ways of obtaining an absolute placement are conceivable as well.

As shown in FIG. 7a, an imaging device is used for determining a measure for the position of one calibration marker Mc. It should be expressed that the method of calibration may be repeated for each calibration marker provided on the calibration body. Additionally, the method of calibration may be repeated for one or more calibration markers after having calibrated the apparatus already for said one or more calibration bodies. Thus, calibration may be performed multiple times for a single calibration marker.

In general, calibration according to the invention takes place as follows.

First, the apparatus is controlled in such a way that the image center Ic of the imaging device is directed to the expected position of the center of the calibration marker Mc. Hence the imaging device is used for determining the resulting set position. From FIG. 7a it is clear that this expected position does not co-align with the resulting set position. The resulting set position (which is equal to the image center Ic of FIG. 7a) differs from the center of the calibration marker Mc. The difference between the expected position and the resulting set position may be expressed as a calibration marker difference vector Vc, defined as the difference between the expected position of the calibration marker Mc and the resulting set position Ic.

Next, as shown in FIG. 7b, the calibration body 31 is removed and the solidifying device is controlled for making a solidifying marker that relates to the calibration marker. In particular, the solidifying device is controlled with the intention to make a solidifying marker that co-aligns with the position of the calibration marker. If the resulting solidifying marker co-aligns with the calibration marker, then the apparatus is correctly calibrated for the respective calibration marker position. FIG. 7b shows that the imaging device is brought to the resulting set position (the same as for FIG. 7a). Here also, the apparatus is thus controlled based on the expected position and a resulting set position Ic is determined. In the resulting set position the solidifying marker Ms is viewed. With the image it is possible to determine a measure for the position of the solidifying marker Ms. Here, it is also possible to determine a solidifying marker difference vector Vs, defined as the difference between the solidifying marker Ms and the resulting set position Ic.

FIG. 7c shows that based on the positions of both the calibration marker and the solidifying marker related to this calibration marker, a correction vector Vsc may be determined. This correction vector allows the solidifying marker to exactly coalign with the position of the calibration marker. Thus, when the apparatus is controlled to make a mark on a specific desired point, the correction vector may be used to ensure that indeed that specific desired point is reached.

Summarized, FIG. 7a shows that a calibration marker Mc is provided and a measure for the position of the calibration marker Mc is determined. FIG. 7b shows that the solidifying device is controlled for making a solidifying marker Ms that relates to the calibration marker Mc, and that a measure for the position of the solidifying marker Ms is determined. FIG. 7c shows that at least a correction vector Vsc is determined based on the positions of both the calibration marker Mc and the solidifying marker Ms related to this calibration marker Mc.

Figure 8:
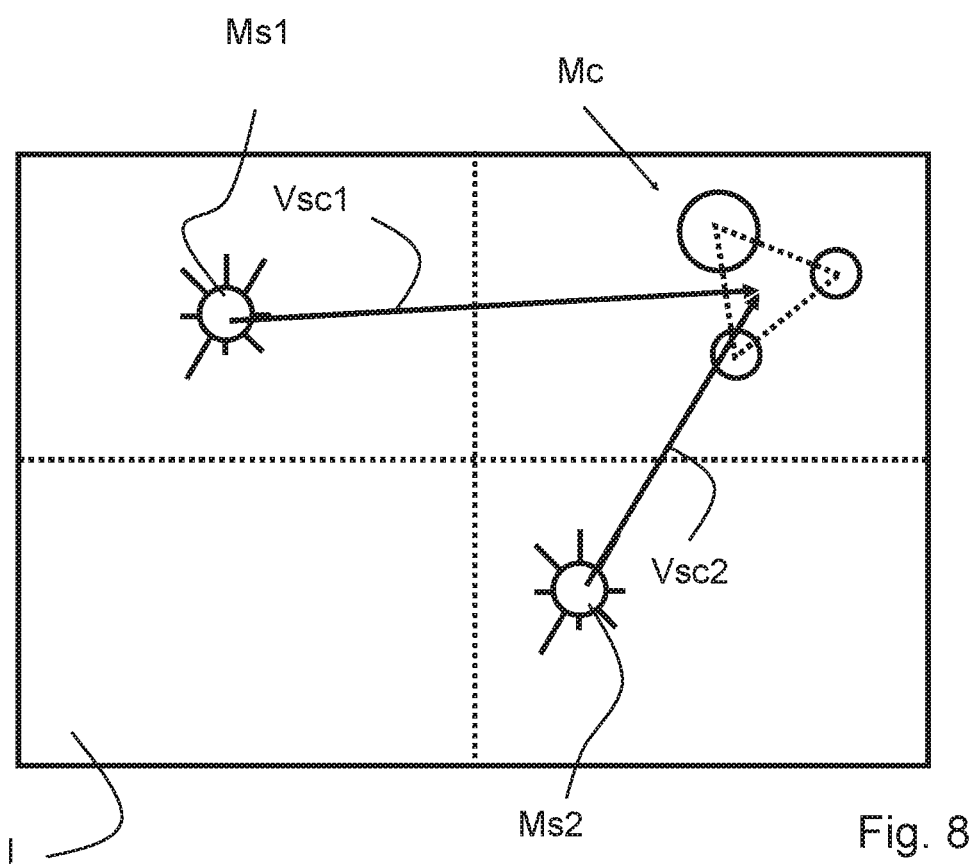
FIG. 8 shows a schematic overview of how the method according to the invention may be used to align multiple solidifying devices with each other.

FIG. 8 shows how the method according to the invention, of which an embodiment is described with respect to FIG. 7a-c, may be used to calibrate an apparatus for producing an object by means of additive manufacturing that comprises a solidifying device and at least one further solidifying device. As described with respect to FIG. 7a-7c a correction vector Vsc1 may be obtained for the first solidifying device. In a similar way, a correction vector Vsc2 may be obtained for the further solidifying device. It is noted in this respect that in determining the correction vectors Vsc1 and Vsc2 it is possible to use a single imaging device. Alternatively, each solidifying device may be provided with it's own imaging device. Due to the fact that the calibration marker has an absolute position, the two correction vectors Vsc1 and Vsc2 may be determined such that they correct the position of the solidifying device towards the same absolute reference point. Thus, the position of the solidifying marker Ms1 may be corrected to align with the absolute position of the calibration marker Mc, and the position of the further solidifying marker Ms2 may be corrected to align with the same absolute position of the calibration marker Mc.

In effect, the method according to this embodiment comprises the further steps of controlling the further solidifying device for making a further solidifying marker Ms2 that relates to the calibration marker Mc; determining a measure for the position of the further solidifying marker Ms2; and determining at least a further correction vector Vsc2 based on the positions of both the calibration marker Mc and the further solidifying marker Ms2 related to this calibration marker Mc.

As indicated with respect to FIG. 8, it is possible that a single imaging device is used. Alternatively, the apparatus for producing an object by means of additive manufacturing may comprise at least one further imaging device for determining a measure for the position of the calibration marker and/or for determining a measure for the position of the further solidifying marker. The use of a further imaging device increases the accuracy of the calibration, as it allows a dedicated imaging device for each solidifying marker, in particular relating to a single calibration marker. The further imaging device may be arranged such that an optical path of the further imaging device, in use of the apparatus, coincides at least partly with an optical path of the electromagnetic radiation of the further solidifying device.

The invention claimed is:

1. A method for calibrating an apparatus for producing an object by means of additive manufacturing, wherein the apparatus comprises:
    a process chamber for receiving a bath of material configured to be solidified by exposure to electromagnetic radiation;
    a support for positioning the object in relation to the surface level of the bath of material; and
    a solidifying device for solidifying a selective layer-part of the material on the surface level by means of electromagnetic radiation;
    wherein the method comprises the step of providing, on or near the support, a calibration marker that faces the solidifying device, and the step of providing a calibration system with an imaging device configured to be directed to the support, wherein the apparatus further comprises a deflector unit, and wherein the imaging device and the solidifying device are aligned and operate via the deflector unit such that an optical path of the imaging device, in use of the apparatus, coincides with an optical path of the electromagnetic radiation of the solidifying device; and
    wherein the method comprises the further steps of:
    a) determining, with the imaging device, a measure for the position of the calibration marker;
    b) controlling the solidifying device for making a solidifying marker that relates to the calibration marker;
    c) determining, with the imaging device via the deflector unit, a measure for the position of the solidifying marker; and
    d) determining, with the calibration system, at least a correction vector based on the positions of both the calibration marker and the solidifying marker related to this calibration marker.

2. The method according to claim 1, wherein the step of determining a measure for the position of the calibration marker comprises:
    determining an expected position of the calibration marker; and
    controlling, based on the expected position, the apparatus and determining a resulting set position.

3. The method according to claim 2, further comprising the step of determining a calibration marker difference vector, defined as the difference between the expected position of the calibration marker and the resulting set position.

4. The method according to claim 1, wherein the step of determining the measure for the position of the solidifying marker comprises:
    determining an expected position of the calibration marker; and
    controlling, based on the expected position, the apparatus and determining a resulting set position.

5. The method according to claim 4, wherein the method further comprises the step of determining a solidifying marker difference vector, defined as the difference between the solidifying marker and the resulting set position.

6. The method according to claim 1, wherein the apparatus for producing an object by means of additive manufacturing comprises a further solidifying device, and wherein the method comprises the further steps of:
    controlling the further solidifying device for making a further solidifying marker that relates to the calibration marker;
    determining, with the calibration system, a measure for the position of the further solidifying marker; and
    determining, with the calibration system, at least a further correction vector based on the positions of both the calibration marker and the further solidifying marker related to this calibration marker.

7. The method according to claim 6, wherein the calibration system comprises at least a further imaging device, wherein the further imaging device is used for obtaining an image of the calibration marker and/or of the further solidifying marker.

8. The method according to claim 7, wherein the further imaging device is arranged such that an optical path of the further imaging device, in use of the apparatus, coincides, at least partly, with an optical path of the electromagnetic radiation of the further solidifying device.

9. The method according to claim 1, wherein at least a further calibration marker is provided, and at least part of the method is repeated at least once for the at least one further calibration marker.

10. The method according to claim 1, wherein the solidifying device and the imaging device are not required to be operated at the same time.

11. An apparatus for producing an object by means of additive manufacturing, comprising:
   a process chamber for receiving a bath of material configured to be solidified by exposure to electromagnetic radiation;
   a support for positioning the object in relation to the surface level of the bath of material;
   a solidifying device for solidifying a selective layer-part of the material on the surface level by means of electromagnetic radiation; and
   a calibration system having an imaging device configured to be directed to the support, wherein the apparatus further includes a deflector unit and the solidifying device and the imaging device operate via the deflector unit such that an optical path of the imaging device, in use of the apparatus, coincides with an optical path of the electromagnetic radiation of the solidifying device,
   wherein the calibration system is adapted and arranged for:
   a) determining, with the imaging device, a measure for the position of a calibration marker that is directed towards the solidifying device;
   b) controlling the solidifying device for making a solidifying marker that relates to the calibration marker;
   c) determining, with the imaging device via the deflector unit, a measure for the position of the solidifying marker; and
   d) determining at least a correction vector based on the positions of both the calibration marker and the solidifying marker related to this calibration marker.

12. The apparatus according to claim 11, wherein the apparatus comprises a thermal conditioning arrangement for thermally conditioning the imaging device.

13. The apparatus according to claim 12, wherein the apparatus comprises the deflector unit for deflecting the electromagnetic radiation, wherein the thermal conditioning arrangement is further arranged for thermally condition the deflector unit and for thermally conditioning a part of the apparatus connecting the imaging device to the deflector unit.

14. The apparatus according to claim 11, wherein the apparatus comprises a further solidifying device, and the calibration system is adapted and arranged for:
   controlling the further solidifying device for making a further solidifying marker that relates to the calibration marker;
   determining, with the calibration system, a measure for the position of the further solidifying marker; and
   determining at least a further correction vector based on the positions of both the calibration marker and the further solidifying marker related to this calibration marker.

15. The apparatus according to claim 14, wherein the calibration system comprises at least one further imaging device for obtaining an image of the calibration marker and/or of the further solidifying marker.

16. The apparatus according to claim 15, wherein the deflector unit is arranged in such a way that an optical path of the further imaging device, in use of the apparatus, coincides with an optical path of the electromagnetic radiation of the further solidifying device.

17. The apparatus according to claim 11, wherein the solidifying device and the imaging device are not required to be operated at the same time.

* * * * *